(12) United States Patent
Huang

(10) Patent No.: US 10,666,931 B2
(45) Date of Patent: May 26, 2020

(54) AUTOSTEREOSCOPIC DISPLAY DEVICE AND AUTOSTEREOSCOPIC DISPLAY METHOD

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 703 days.

(21) Appl. No.: 15/245,204

(22) Filed: Aug. 24, 2016

(65) Prior Publication Data
US 2017/0302911 A1  Oct. 19, 2017

(30) Foreign Application Priority Data
Apr. 15, 2016  (TW) ............................. 105111750 A

(51) Int. Cl.
*H04N 13/354* (2018.01)
*H04N 13/305* (2018.01)
(Continued)

(52) U.S. Cl.
CPC ........... *H04N 13/354* (2018.05); *G02B 27/30* (2013.01); *G02B 30/24* (2020.01); *G02B 30/27* (2020.01);
(Continued)

(58) Field of Classification Search
USPC .......................................................... 348/55
See application file for complete search history.

(56) References Cited

U.S. PATENT DOCUMENTS

2006/0256436 A1* 11/2006 Javidi ................ G02B 27/2214
359/466
2011/0304614 A1* 12/2011 Yasunaga ........... G02B 27/0093
345/419
(Continued)

FOREIGN PATENT DOCUMENTS

CN   101978306 A   2/2011
CN   104834174 A   8/2015
(Continued)

OTHER PUBLICATIONS

Yasuhiro Takaki and Shigeki Uchida, "Table screen 360-degree three-dimensional display using a small array of high-speed projectors," Optics Express;20(8), 8848-8861 (Apr. 9, 2012) (Year: 2012).*

(Continued)

*Primary Examiner* — Christopher S Kelley
*Assistant Examiner* — Ana Picon-Feliciano
(74) *Attorney, Agent, or Firm* — CKC & Partners Co., LLC

(57) ABSTRACT

An autostereoscopic display includes a plurality of projectors and a screen. Each of the projectors is configured to provide a corresponding lamp image unit. Each of the lamp image units includes array of lamp images actuated in time sequence and projecting to different directions. The screen has an image plane and includes a first micro-lens array and a second micro-lens array. The first micro-lens array is configured to guide the lamp image units to the image plane such that the lamp image units are connected end to end and arranged in a ring on the image plane as a lamp image set. The second micro-lens array is located corresponding to the first micro-lens array and configured to magnify the projection angles of the lamp image units in the lamp image set and project the lamp image set to an observing surface.

13 Claims, 9 Drawing Sheets

(51) Int. Cl.
  *H04N 13/32* (2018.01)
  *H04N 13/363* (2018.01)
  *G02B 30/24* (2020.01)
  *G02B 30/27* (2020.01)
  *G02B 27/30* (2006.01)

(52) U.S. Cl.
  CPC ........... *H04N 13/305* (2018.05); *H04N 13/32* (2018.05); *H04N 13/363* (2018.05)

(56) References Cited

U.S. PATENT DOCUMENTS

| | | | |
|---|---|---|---|
| 2012/0139897 A1 | 6/2012 | Butler et al. | |
| 2013/0155377 A1* | 6/2013 | Huang | G02B 27/2214 353/7 |
| 2014/0071352 A1* | 3/2014 | Huang | G02B 27/2264 349/5 |
| 2015/0042653 A1* | 2/2015 | Takaki | G03B 35/20 345/426 |
| 2015/0226973 A1 | 8/2015 | Huang | |

FOREIGN PATENT DOCUMENTS

| | | |
|---|---|---|
| TW | 201502583 A | 1/2015 |
| TW | 201531791 A | 8/2015 |

OTHER PUBLICATIONS

Shigeki Uchida, Yasuhiro Takaki ;"360-degree three-dimensional table-screen display using small array of high-speed projectors", Proc. SPIE 8288, Stereoscopic Displays and Applications XXIII, 82880D (Feb. 6, 2012);https://doi.org/10.1117/12.909603. (Year: 2012).*

S. Yoshida, "fVisiOn: 360-degree viewable glasses-free tabletop 3D display composed of conical screen and modular projector arrays," Opt. Express 24, 13194-13203 (2016). (Year: 2016).*

H. Horimai et al., "Full-Color 3D Display System with 360 Degree Horizontal Viewing Angle," Proc. Int. Symposium of 3D and Contents, 7-10, 2010.

* cited by examiner

AUTOSTEREOSCOPIC DISPLAY DEVICE AND AUTOSTEREOSCOPIC DISPLAY METHOD

RELATED APPLICATIONS

This application claims priority to Taiwan Application Serial Number 105111750, filed Apr. 15, 2016, which is herein incorporated by reference.

BACKGROUND

Technical Field

The present disclosure relates to a stereoscopic display, particularly, to an autostereoscopic display device.

Description of Related Art

A conventional stereoscopic display exploits the binocular parallax of humans to provide two different images respectively to the two eyes of an observer, in order to achieve a stereoscopic display. Mainstream stereoscopic display devices nowadays require special glasses worn by the observer to distinguish left-eye and right-eye images, causing inconvenience in use.

An autostereoscopic display, by precise control, transmits the light beams of different light source images to different spatial positions to send the different images to the left-eye and the right-eye of the observer simultaneously so that the observer perceives a stereoscopic image without wearing glasses. Autostereoscopic display technology overcomes the inconvenience associated with the use of glasses in stereoscopic display technology, and has become an area of major development in the field of stereoscopic display technologies in recent times.

SUMMARY

An aspect of the present disclosure is an autostereoscopic display device. The autostereoscopic display device includes a plurality of projectors, each of the projectors being configured to provide a corresponding lamp image unit, each of the lamp image units having a plurality of lamp images actuated in sequence, the lamp images respectively projecting to different directions; and a screen having an image plane, including: a first micro-lens array configured to guide the lamp image units to the image plane, such that the lamp image units are connected to each other end to end and circular-aligned as a lamp image unit set on the image plane; and a second micro-lens array disposed opposing the first micro-lens array, the second micro-lens array being configured to enlarge projection angles of the lamp image units in the lamp image unit set, and project the lamp image unit set to an observing surface.

Another aspect of the present disclosure is an autostereoscopic display method. The autostereoscopic display method includes: providing a plurality of projectors, each of the projectors being configured to provide a corresponding lamp image unit, each of the lamp image units having a plurality of lamp images actuated in sequence and projecting to different directions respectively; and projecting the lamp image units onto a screen, which includes: projecting the lamp image units to a first micro-lens array of the screen to guide the lamp image units respectively to an image plane of the screen, such that the lamp image units are connected to each other end to end and circular-aligned as a lamp image unit set on the image plane; and guiding the lamp image unit set to a second micro-lens array of the screen to enlarge projection angles of the lamp image units in the lamp image unit set, and project the lamp image unit set to an observing surface.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
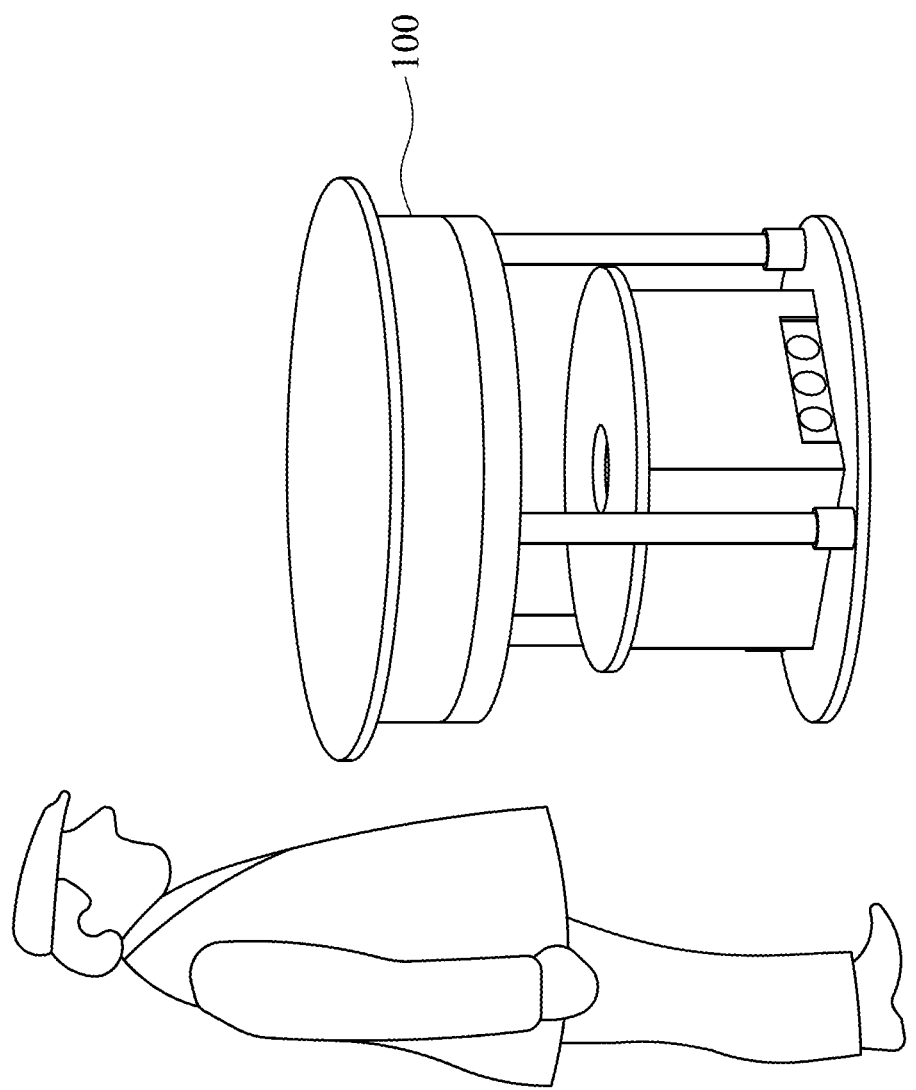
FIG. 1 is a schematic diagram illustrating the operation situation of an autostereoscopic display device according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

Reference is made to FIG. 1. FIG. 1 is a schematic diagram illustrating the operation situation of an autostereoscopic display device 100 according to some embodiments of the present disclosure. In some embodiments, the autostereoscopic display device 100 is a tabletop display using Time-Multiplex projectors to achieve non-glasses 3D stereoscopic images. Specifically, Time-Multiplex projectors may provide a plurality of lamp images actuated in sequence and respectively project to different directions. When the two eyes of an observer receive the lamp images respectively, a 3D image visual effect is perceived. In addition, when the observer located at different locations of the tabletop display, their eyes may also receive lamp images corresponding to their current location. Alternatively stated, the observers at different locations may see 3D images from different view angles. In the following paragraphs, the non-glasses 3D projecting method achieved by the autostereoscopic display device 100 will be explained with the accompanying drawings.

Figure 2:
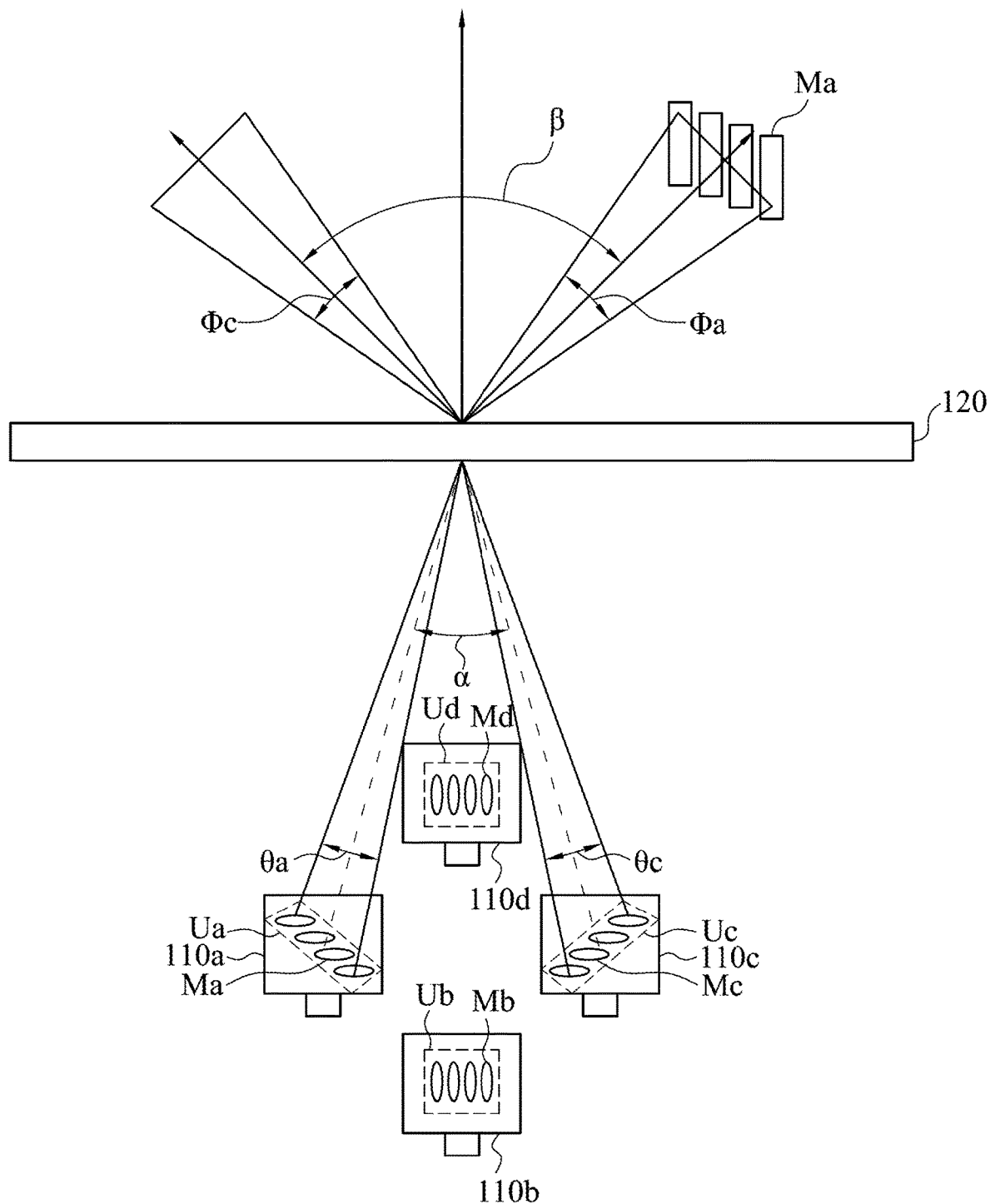
FIG. 2 is a schematic diagram illustrating an autostereoscopic display device according to some embodiments of the present disclosure.

Reference is made to FIG. 2. FIG. 2 is a schematic diagram illustrating an autostereoscopic display device 100 according to some embodiments of the present disclosure. As shown in the FIG. 2, the autostereoscopic display device 100 includes a plurality of projectors 110a, 110b, 110c and 110d, and a screen 120. The projectors 110a-110d are configured to provide a lamp image unit respectively. As illustratively shown in FIG. 2, the projector 110a provides a lamp image unit Ua, the projector 110b provides a lamp image unit Ub, the projector 110c provides a lamp image unit Uc, the projector 110d provides a lamp image unit Ud.

Each of the lamp image units Ua-Ud has a plurality of lamp images actuated in sequence. The lamp images respectively project to different directions to form a projection angle therebetween. As illustratively shown in FIG. 2, the lamp image unit Ua has lamp images Ma actuated in sequence, and the lamp images Ma project to different directions respectively to form the projection angle θ a, and after passing the screen 120, the lamp images Ma project to different directions respectively to form the projection angle φ a. Similarly, the lamp image units Ub-Ud have lamp images Mb-Md actuated in sequence respectively, and the lamp images Mb-Md project to different directions respectively to form the projection angles. For the convenience of explanation, only projection angles θ a, θc and projection angles φ a, φc are illustrated in the FIG. 2.

In addition, an angle α is shown between the central optical axis of the lamp image unit Ua and the central optical axis of the lamp image unit Uc entering the screen 10, and an angle β is shown between the central optical axis of the lamp image unit Ua and the central optical axis of the lamp image unit Uc leaving the screen 10.

Figure 3:
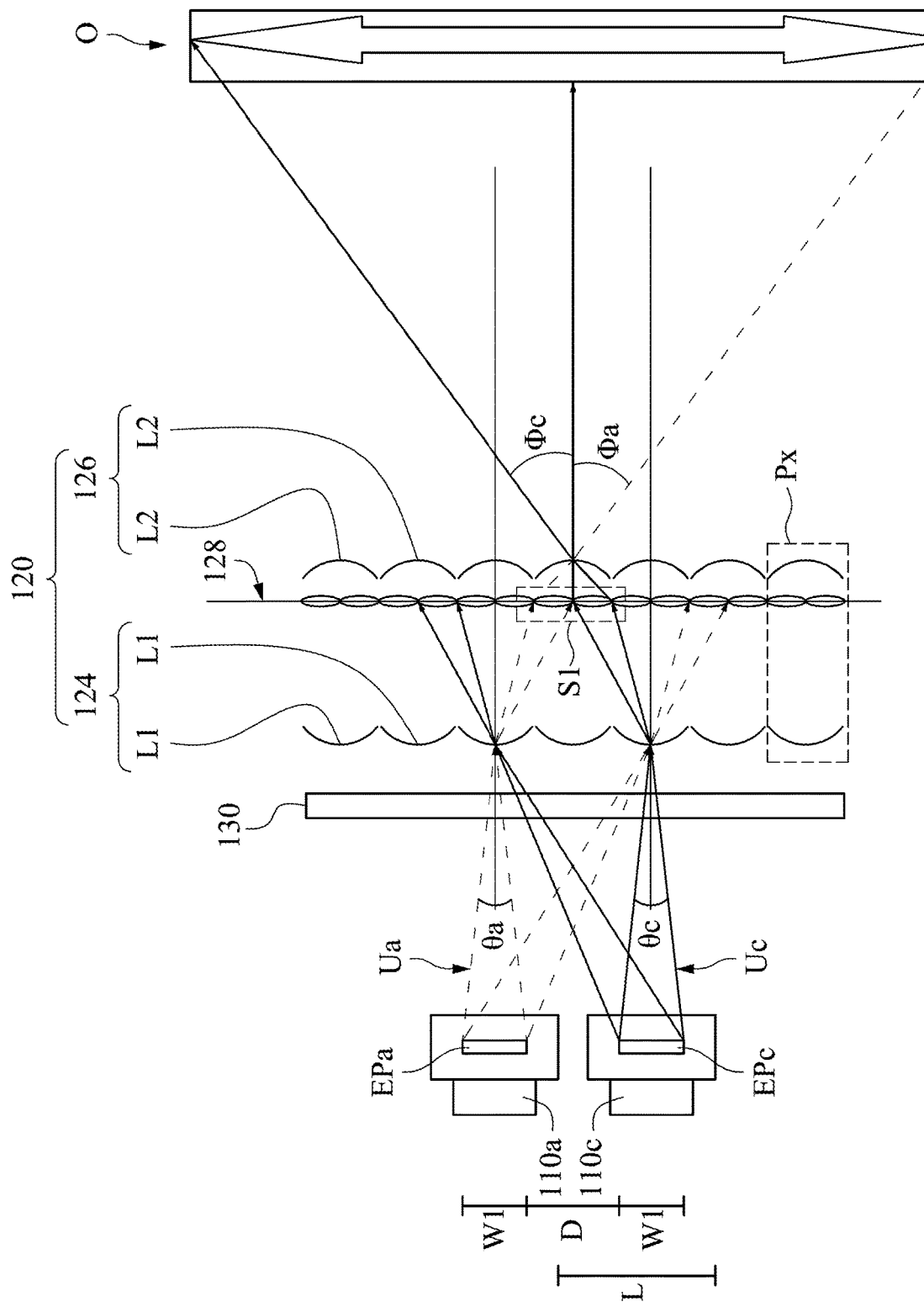
FIG. 3 is a schematic diagram illustrating an autostereoscopic display device according to some embodiments of the present disclosure.

Reference is made to FIG. 3. FIG. 3 is a schematic diagram illustrating an autostereoscopic display device 100 according to some embodiments of the present disclosure. In order to simplify the explanation of the operation method of the autostereoscopic display device 100, only two projectors 110a and 110b and corresponding lamp image units Ua and Ub of the four projectors 110a-110d are illustrated in FIG. 3. One of the skilled in the art can understand the operation of the projection of the lamp image units Ua-Ud of four sets projectors 110a-110d are similar. In addition, for better understanding, the path of the lamp image unit Ua is illustrated with the dotted line, while the path of the lamp image unit Ub is illustrated with the solid line.

As shown in FIG. 3, in some embodiments, the autostereoscopic display device 100 may include a collimating lens 130 disposed between the projectors 110a, 110b and the screen 120. The collimating lens 130 is configured to collimate the lamp image units Ua and Ub projected by the projectors 110a and 110b. In some embodiments, the collimating lens 130 may be the Fresnel lens, but the present disclosure is not limited thereto.

In the present embodiments, the projectors 110a and 110b may both be spot light sources, that is, the lamp image units Ua and Ub respectively projected by the projectors 110a and 110b not only have projection angles θ a and θb respectively, but also have spread angles of the spot light sources, in which the spread angles have an effect of the traveling direction of the lamp image units Ua and Ub in the screen 120.

The collimating lens 130 may collimate the lamp image units Ua and Ub such that the lamp image units Ua and Ub is collimated to a surface light source, and the spread angles are removed. Thus, the traveling direction of the lamp image units Ua and Ub in the screen is determined according to the off-axis angular degrees.

After collimated by the collimating lens 130, the lamp image units Ua and Ub enter the screen 120. The screen 120 includes micro-lens array 124 and micro-lens array 126. In some embodiment, the screen 120 has an image plane 128 on the confocal plane of the micro-lens array 124 and the micro-lens array 126.

Alternatively stated, in some embodiments of the present disclosure, after the lamp image units Ua-Ud are guided by the collimating lens 130 to the micro-lens array 124, the micro-lens array 124 guides the lamp image units Ua-Ud respectively to the image plane 128 such that the lamp image units Ua-Ud are connected to each other end to end, and circular-aligned as a lamp image unit set S1 on the image plane 128. For example, as illustrated in FIG. 3, the micro-lens array 124 guides the lamp image units Ua and Ub respectively to the image plane 128 such that the lamp image units Ua and Ub are connected to each other end to end. It is noted that, although in the four projectors 110a-110d, only two projectors 110a and 110b and corresponding lamp image unit Ua and Ub are illustrated in the FIG. 3, one of those skilled in the art can understand that the operations of the four projectors 110a-110d projecting the lamp image units Ua-Ud are similar to each other. Therefore, similar to the lamp image unit Ua and Ub, the lamp image unit Ub and Uc are connected to each other end to end, the lamp image unit Uc and Ud are connected to each other end to end, and the lamp image unit Ud and Ua are connected to each other end to end. Thus, the lamp image units Ua-Ud are circular-aligned as the lamp image unit set S1 on the image plane 128.

Specifically, the screen 120 has a plurality of pixels Px arranged as an array. The pixels Px correspond to a plurality of lens units L1 in the micro-lens array 124. When the collimated lamp image units Ua-Ud enter each of the lens units L1, the lens units L1 guide the lamp image units Ua-Ud to the image plane 128 such that the lamp image units are circular-aligned as the lamp image unit set S1 on the image plane 128.

As shown in FIG. 3, in some embodiments, the micro-lens array 126 is disposed opposing the micro-lens array 124 and configured to enlarge projection angles of the lamp image units Ua-Ud in the lamp image unit set S1, and project the lamp image unit Ua-Ud to an observing surface O.

Similar to the micro-lens array 124, the micro-lens array 126 also includes a plurality of lens units L2. The pixels Px in the screen 120 correspond to the lens units L2 in the micro-lens array 126. The lens units L2 are configured to enlarge projection angles θ a-θd of the lamp image units Ua-Ud in the lamp image unit set S1 on the image plane of the corresponding pixels Px.

Figure 4:
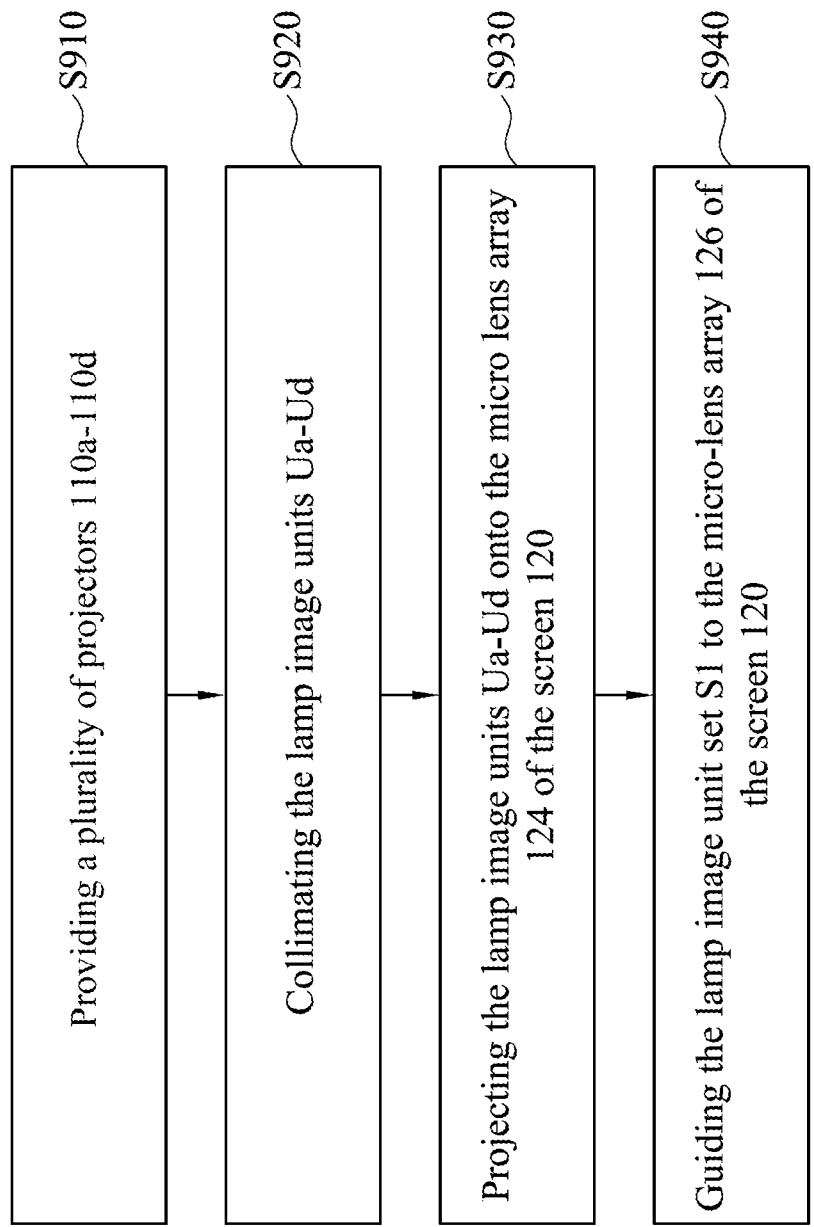
FIG. 4 is a flow chart illustrating an autostereoscopic display method according to some embodiments of the present disclosure.

Reference is made to FIG. 3 and FIG. 4 together for the operation of the autostereoscopic display. FIG. 4 is a flow chart illustrating an autostereoscopic display method 400 according to some embodiments of the present disclosure. To facilitate a clear description of the autostereoscopic display method 400, the autostereoscopic display method 400 is applied to the autostereoscopic display device 100 of FIG. 3, but the present disclosure should not be limited thereto. First, in act S910, a plurality of projectors are provided. For example, in the present embodiment, the four projectors 110a-110d are provided. It is noted that the number of the projectors 110a-110d are illustrative only and should not limit the claimed scope of the present disclosure. A person having ordinary skill in the art may select a suitable number of the projectors 110a-110d according to actual requirements. For example, in some embodiments, providing six projectors are chosen in implementation in act S910.

Subsequently, in act S920, the lamp image units Ua-Ud are collimated by the collimating lens 130. Specifically, the collimating lens 130 removes the spread angles of the lamp image units Ua-Ud, so as to guide the lamp image units Ua-Ud to the lens unit L1 in the micro-lens array 124.

Subsequently, in act S930, the lamp image units Ua-Ud are projected onto the screen 120. In some embodiments, the lamp image units Ua-Ud are firstly projected to the lens unit L1 in the micro-lens array 124, and the lens unit L1 in the micro-lens array 124 respectively guide the lamp image units Ua-Ud to the image plane 128, such that the lamp image units Ua-Ud are connected to each other end to end, and circular-aligned as the lamp image unit set S1 on the image plane 128.

Figure 5:
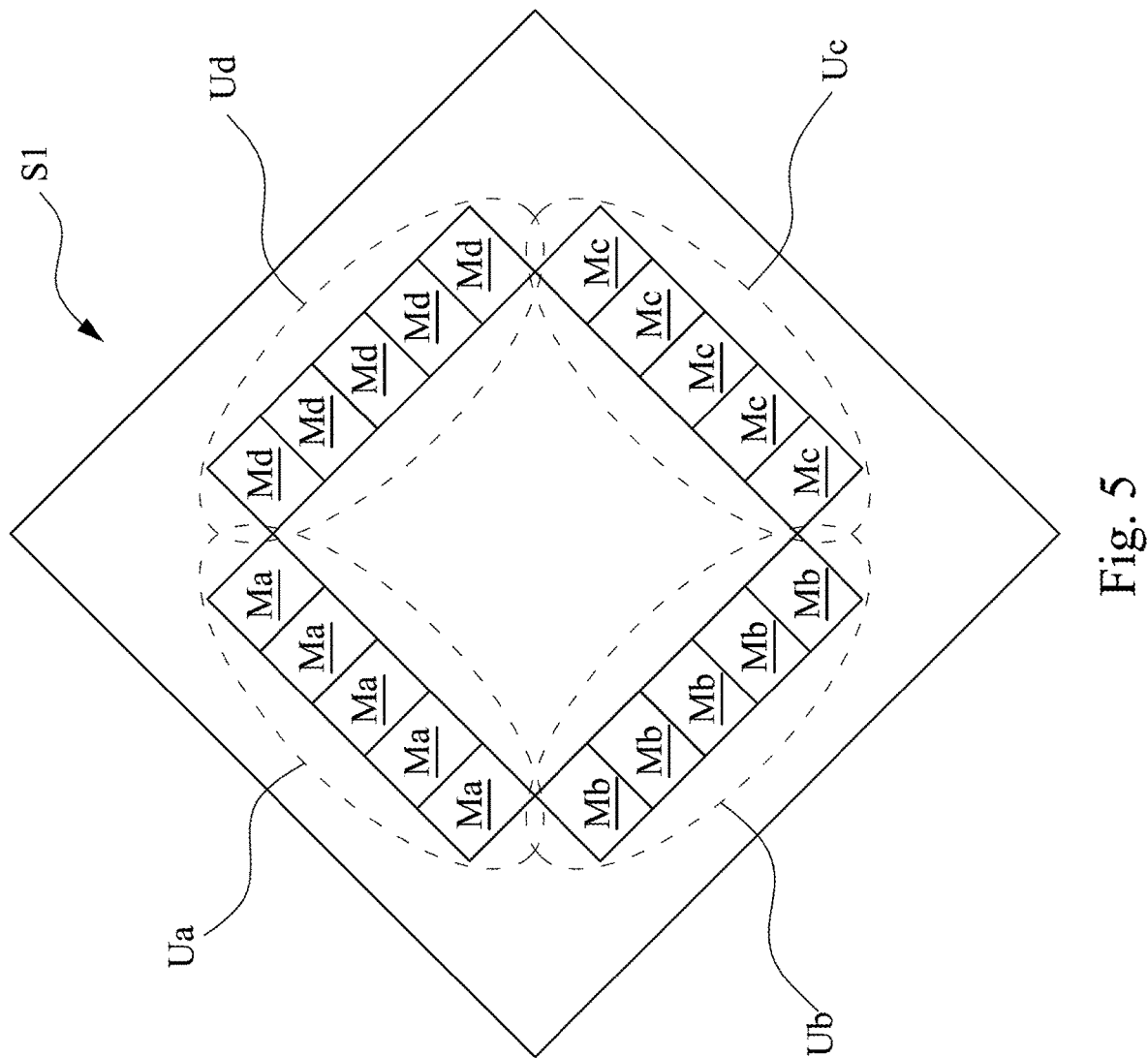
FIG. 5 is a schematic diagram illustrating the lamp image unit set according to some embodiments of the present disclosure.

Reference is made to FIG. 5 together. FIG. 5 is a schematic diagram illustrating the lamp image unit set S1 according to some embodiments of the present disclosure. It is noted that, as illustratively shown in FIG. 4, "connected to each other end to end, and circular-aligned as the lamp image unit set S1 on the image plane 128" described herein means that on the image plane 128, any two adjacent lamp image units (e.g., lamp image units Ua and Ub, lamp image units Ub and Uc, lamp image units Uc and Ud, lamp image units Ud and Ua) are aligned along different directions, and for each of the lamp image units (e.g., Ua), one terminal is connected to one terminal of an adjacent lamp image unit (e.g., Ub), and another terminal is connected to one terminal of another adjacent lamp image unit (e.g., Ud). Alternatively stated, there is no gap between any two of the adjacent lamp image units Ua-Ud.

Reference is again made to FIG. 3. For better explanation of the travelling path of the lamp image units Ua-Ud, only some of the light beams of the projectors 110a and 110b are illustrated in the FIG. 3. However, in fact the lamp image units Ua-Ud projected from each of the projectors 110a-110d may be projected to the entire micro-lens array 124 respectively; that is, the projectors 110a-110d may reach each lens units L1. Each lens units L1 may guide the lamp image units Ua-Ud respectively to different positions on the image plane 128, such that the lamp image units Ua-Ud are connected to each other end to end, and circular-aligned as the lamp image unit set S1 on the image plane 128. Each of the lamp image unit sets S1 corresponds to a corresponding pixel Px. Alternatively stated, each of the lamp image unit sets S1 also corresponds to a corresponding lens unit L1 and a corresponding lens unit L2.

Finally, in act S940, the lamp image unit set S1 on the image plane 128 is guided to the corresponding lens unit L2 in the micro-lens array 126, so as to enlarge projection angles θ a~θd of the lamp image units Ua~Ud in the lamp image unit set S1, and project the lamp image unit set S1 to the observing surface O. For the convenience of explanation, the lens units L1 and the lens units L2 are defined in spatial order from top to bottom. For example, the lens unit L1 at the top is defined as the first lens unit L1, and the lens unit L1 below the first lens unit L1 is defined as the second lens unit L1, and so on.

Specifically, in the FIG. 3, the lamp image unit Ua through the third lens unit L1 and the lamp image unit Ub through the fifth lens unit L1 are combined on the image plane as the lamp image unit set S1 corresponding to the fourth lens unit L2. This lamp image unit set S1 then passes through the fourth lens unit L2. The lamp image unit Ua of the lamp image unit set S1 passing through the fourth lens unit L2 has a projection angle φ a, in which the projection angle φ a is larger than the projection angle θ a. The lamp image unit Ub of the lamp image unit set S1 passing through the fourth lens unit L2 has a projection angle θb, in which the projection angle φb is larger than the projection angle θb. It is noted that, though not illustrated in the drawing, the lamp image units Uc and Ud of the lamp image unit set S1 also have corresponding projection angles φc and φd, in which the projection angles φc and φd are larger than the corresponding projection angles θc and θd.

In addition, since the lamp image units Ua-Ud are circular-aligned as the lamp image unit set S1, when the lamp image unit set S1 is projected to the circular observing surface O, the observers at different positions may see the 3D images of the corresponding view angles.

Figure 6:
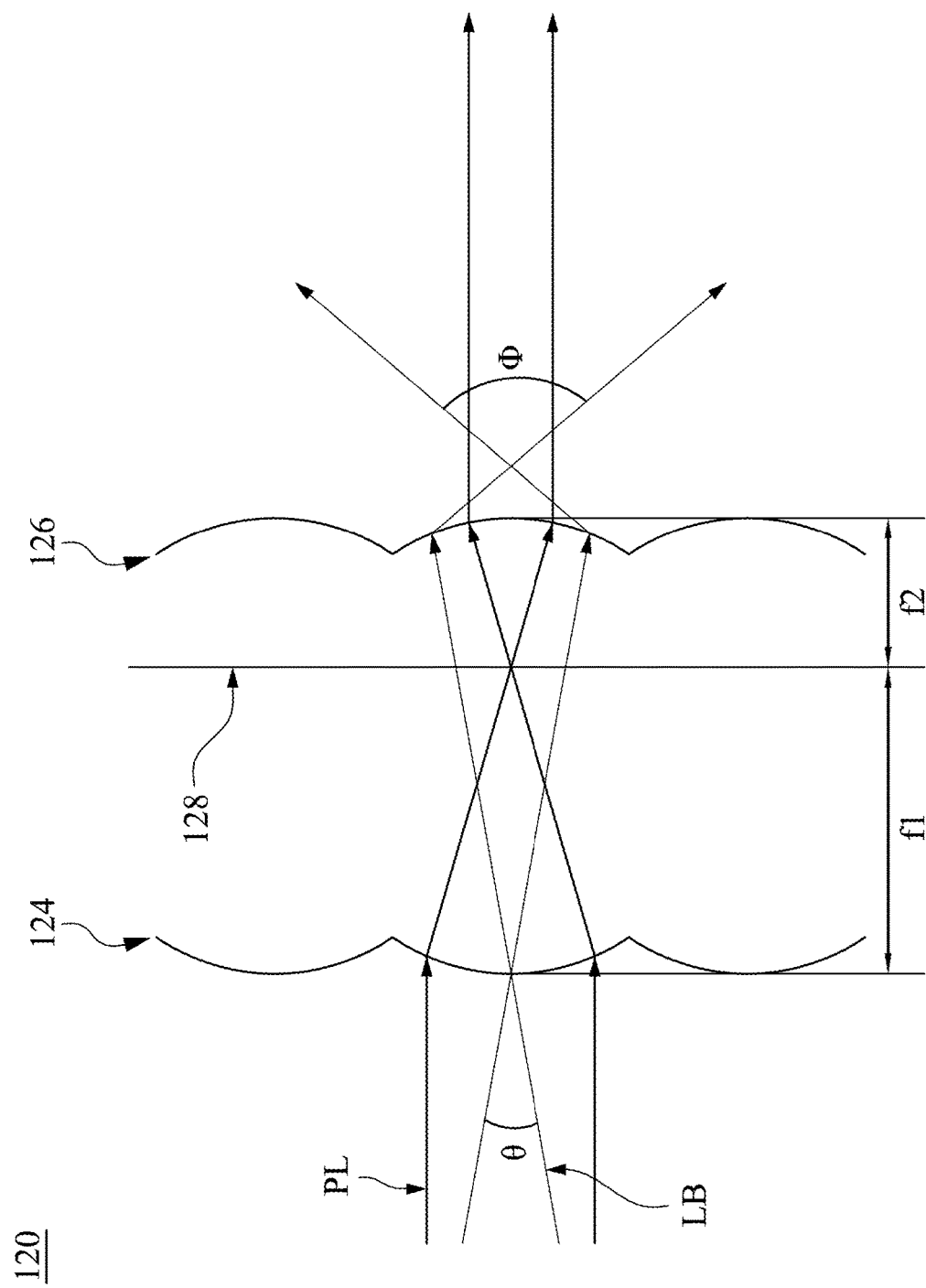
FIG. 6 is a partially enlarged diagram illustrating the screen in the FIG. 3 according to some embodiments of the present disclosure.

Reference is made to FIG. 6. FIG. 6 is a partially enlarged diagram illustrating the screen 120 in the FIG. 3 according to some embodiments of the present disclosure. As shown in FIG. 6, in some embodiments, the projection angles θ a-θd of the lamp image units Ua-Ud are, generally, between about 0.5° to about 1° due to the limitations of the light modulators' size, the light emitting angles, the widths of the exit pupils of the projectors 110a-110d, and so on. In some embodiments, a first focus length f1 of the lens units L1 and a second focus length f2 of the lens units L2 may be adjusted, such that the first focus length f1 is greater than the second focus length f2. According to the inverse correlation between focus lengths and angles, the focus length gets greater when the angle gets smaller. If the light beam LB incident the lens unit L1 has an angle θ, and the light beam LB emerging from the lens unit L2 has an angle φ, since the first focus length f1 is greater than the second focus length f2, the angle φ is greater than the angle θ. Therefore, the projection angle can be enlarged. Furthermore, as stated in aforementioned paragraphs, the image plane 128 may be a confocal plane of the lens units L1 and the lens units L2. That is, a parallel light PL incident the lens units L1 can focus on the image plane 128, and then becomes a parallel light again after passing through the lens units L2. It is noted that the enlarge ratio of the angle φ to the angle θ is (f1/f2) for both the x-axis direction and the y-axis direction. In addition, in some embodiments, the enlarge ratio of the angle β to the angle α in FIG. 2 is also (f1/f2).

The configuration and the autostereoscopic display method mentioned above can eliminate lamp image dead zones between the projectors 110a-110d, and can further enlarge the projection angles θ a-θd and the angle α of the projectors 110a-110d so as to enlarge the viewing angle at the observing surface O. More specifically, the autostereoscopic display method mentioned above may be applied to a light field display. In some embodiments, the light field display provides a large number, 100+ for example, of view zones. Projectors with mufti-views, such as the projectors 110a-110d, may be applied to provide such a number of views. If each of the projectors provides 32 views, four of the projectors can provide 128 views in a 360-degree surrounding area, to achieve a light field display.

In addition, the lamp image dead zone due to the configuration of the projectors 110a-110d may be eliminated by the autostereoscopic display method mentioned above. Specifically, the lamp image dead zone D may exist between the projectors 110a and 110b, the projectors 110b and 110c, the projectors 110c and 110d, and the projectors 110d and 110a due to the configuration of the projectors. For example, in the embodiment shown in FIG. 3, the projectors 110a and 110b have exit pupils EPa and EPb with a width W1 respectively. The lamp image units Ua and Ub are projected from the exit pupils EPa and EPb respectively. Furthermore, there is a distance L between the projectors 110a and 110b. In reality, as shown in FIG. 3, the exit pupils EPa and EPb are separated from each other, i.e., (W1/L)<1, due to the configuration limitations of the projectors 110a and 110b. There is no lamp image generated between the exit pupils EPa and EPb, and thus the lamp image dead zone D is formed. Similarly, the lamp image dead zone D may exist between other projectors 110b-110d due to the above reason, and thus further explanations are omitted herein for the sake of the brevity.

In some embodiments of the present disclosure, there is no gap between any two of the adjacent lamp image units Ua-Ud of the lamp image unit set S1 projecting to the image surface 128. Therefore, the lamp image dead zone D caused by any two of the adjacent lamp image units Ua-Ud can be eliminated on the image plane 128, and the lamp image unit set S1 projecting to the observing surface O have directional continuity. Thus, the issue of the lamp image dead zone generating discontinuous projection angles between views in circular autostereoscopic projection and causing the autostereoscopic display device unable to generate some lamp images with specific projection angles is solved and improved.

While disclosed methods are illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Reference is again made to FIG. 3. As shown in FIG. 3, in some embodiments, the lamp image units Ua-Ud passing through the same lens unit L1 of the micro-lens array 124 may be not adjacent to each other on the image plane 128. Alternatively stated, the lamp image units Ua-Ud passing through the same lens unit L1 of the micro-lens array 124 respectively form different lamp image unit sets S1. Taking FIG. 3 as an example, for the lamp image units Ua and Ub passing through the third lens unit L1, the lamp image unit set S1 formed by the lamp image unit Ua corresponds to the fourth lens unit L2, and the lamp image unit set S1 formed by the lamp image unit Ub corresponds to the second lens unit L2.

Alternatively stated, in some embodiments, the lamp image units Ua-Ud in the same lamp image unit set S1 are guided to the image plane 128 by different lens units L1, and then, connected to each other end to end, and circular-aligned as the lamp image unit set S1 on the image plane 128.

Figure 7:
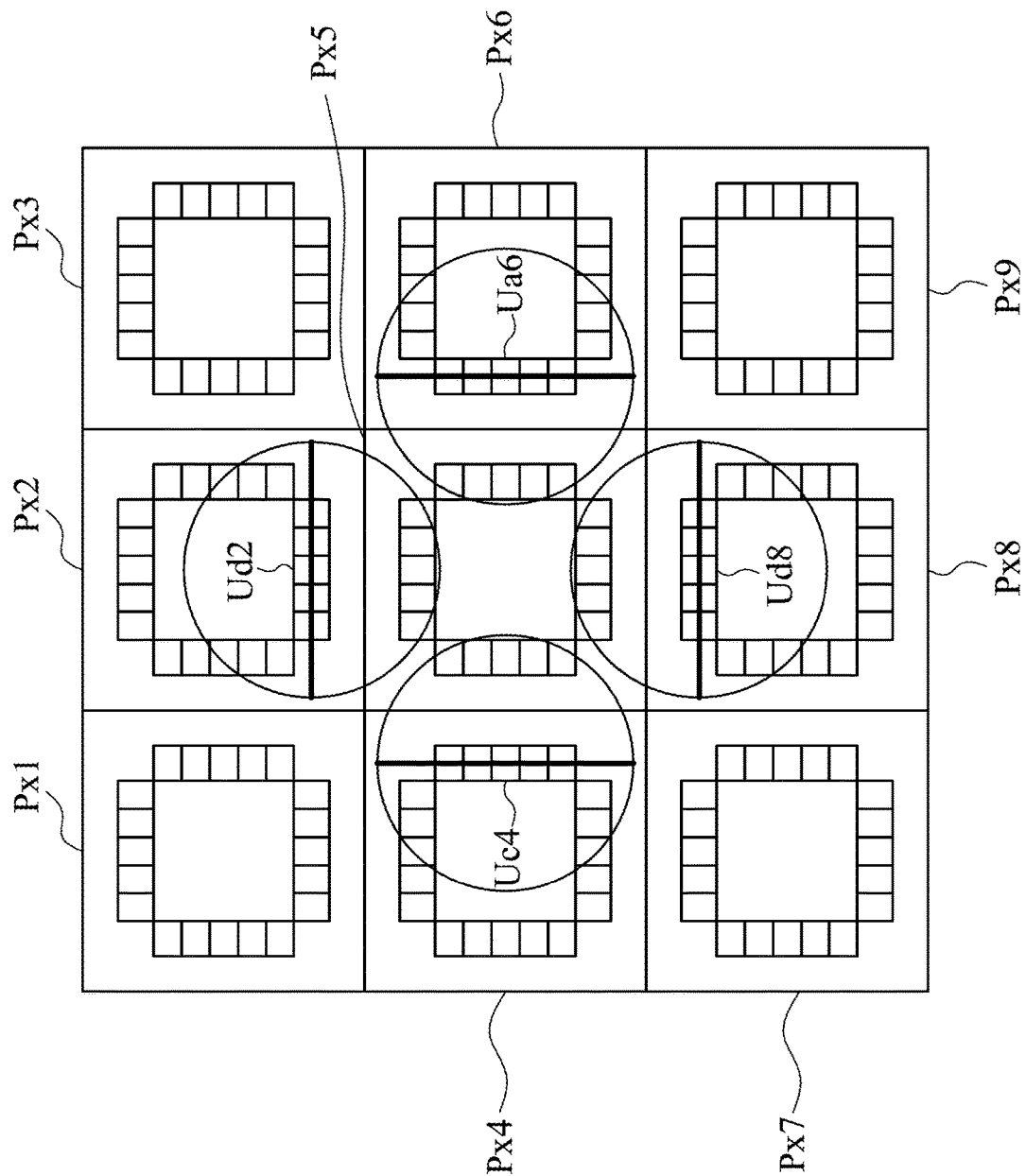
FIG. 7 is a schematic diagram illustrating the screen according to some embodiments of the present disclosure.

Reference is made to FIG. 7 together. FIG. 7 is a schematic diagram illustrating the screen 120 according to some embodiments of the present disclosure so as to explain how to guide the lamp image units Ua-Ud to the image plane 128 to form the lamp image unit set S1 by different lens units L1. As shown in the drawing, the screen 120 includes pixels Px1-Px9 arranged as an array. The pixels Px1-Px9 respectively correspond to one of the lens unit L1 in the micro-lens array 124 and one of the lens unit L2 in the micro-lens array 126.

For example, after collimated by the collimating lens 130, the lamp image units Ua-Ud projected by the projectors 110a-110d enter the pixels Px1-Px9 as plane light sources, in which the lamp image units Ua1-Ud1 enter the lens unit L1 corresponding to the pixel Px1, the lamp image units Ua2-Ud2 enter the lens unit L1 corresponding to the pixel Px2, and so on. Alternatively stated, the lamp image units Uan-Udn enter the lens unit L1 corresponding to the pixel Pxn.

Next, for a target pixel in the pixels Px1-Px9, the lamp image unit set S1 corresponding to the target pixel is guided by the lens unit L1 corresponding to the adjacent pixels Px1-Px9 to the image plane 128. Then, the lamp image unit set S1 is projected to the observing surface O by the lens unit L2 corresponding to the target pixel.

For example, if the pixel Px5 is taken as the target pixel, for the lamp image unit set S1 corresponding to the pixel Px5, the lamp image unit Ua is guided to the image plane 128 by the lens unit L1 corresponding to the adjacent pixel Px6 from the corresponding direction (e.g., the right side in the FIG. 7). The lamp image unit Ub is guided to the image plane 128 by the lens unit L1 corresponding to the adjacent pixel Px2 from the corresponding direction (e.g., the top side in the FIG. 7). The lamp image unit Uc is guided to the image plane 128 by the lens unit L1 corresponding to the adjacent pixel Px4 from the corresponding direction (e.g., the left side in the FIG. 7). The lamp image unit Ud is guided to the image plane 128 by the lens unit L1 corresponding to the adjacent pixel Px8 from the corresponding direction (e.g., the bottom side in the FIG. 7).

Alternatively stated, the lamp image unit set S1 corresponding to the pixel Px5 is formed by the lamp image units Ua6, Ub2, Uc4 and Ud8. Next, the lamp image unit set S1 corresponding to the pixel Px5 is projected to the observing surface by the lens unit L2 corresponding to the pixel Px5.

Thus, the lamp image unit Ua-Ud may be connected to each other end to end and circular-aligned as the lamp image unit set S1 on the image plane 128, such that there is no gap between any two of the adjacent lamp image units Ua-Ud so as to eliminate lamp image dead zones.

Figure 8:
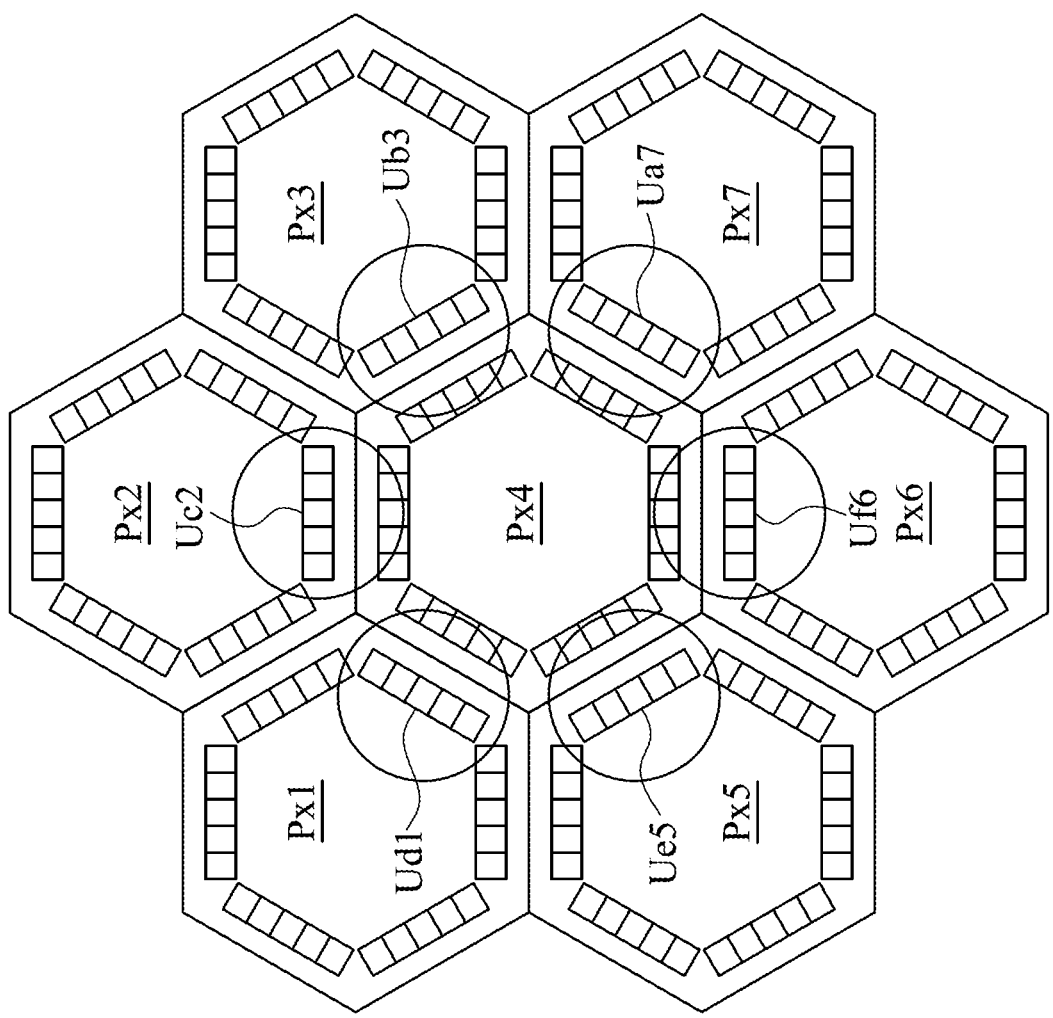
FIG. 8 is a schematic diagram illustrating the screen according to some embodiments of the present disclosure.

Reference is made to FIG. 8 together. FIG. 8 is a schematic diagram illustrating the screen 120 according to some embodiments of the present disclosure. Compared to the embodiments shown in FIG. 7, in the present embodiment, the autostereoscopic display device 100 provides lamp image units Ua-Uf by six projectors, in which lamp image units Ua-Uf connected to each other end to end, and circular-aligned as the lamp image unit set S1 on the image plane 128.

For example, if the pixel Px4 is taken as the target pixel, for the lamp image unit set S1 corresponding to the pixel Px4, the lamp image unit Ua is guided to the image plane 128 by the lens unit L1 corresponding to the adjacent pixel Px7 from the corresponding direction (e.g., the right-bottom side in the FIG. 8). The lamp image unit Ub is guided to the image plane 128 by the lens unit L1 corresponding to the adjacent pixel Px3 from the corresponding direction (e.g., the right-top side in the FIG. 8). The lamp image unit Uc is guided to the image plane 128 by the lens unit L1 corresponding to the adjacent pixel Px2 from the corresponding direction (e.g., the top side in the FIG. 8). The lamp image unit Ud is guided to the image plane 128 by the lens unit L1 corresponding to the adjacent pixel Px1 from the corresponding direction (e.g., the left-top side in the FIG. 8). The lamp image unit Uc is guided to the image plane 128 by the lens unit L1 corresponding to the adjacent pixel Px5 from the corresponding direction (e.g., the left-bottom side in the FIG. 8). The lamp image unit Uf is guided to the image plane 128 by the lens unit L1 corresponding to the adjacent pixel Px6 from the corresponding direction (e.g., the bottom side in the FIG. 8).

Alternatively stated, the lamp image unit set S1 corresponding to the pixel Px4 is formed by the lamp image units Ua7, Ub3, Uc2, Ud1, Ue5 and Uf6. Next, the lamp image unit set S1 corresponding to the pixel Px4 is projected to the observing surface O by the lens unit L2 corresponding to the pixel Px4. Thus, the lamp image unit Ua-Uf may be connected to each other end to end and circular-aligned as the lamp image unit set S1 on the image plane 128, such that there is no gap between any two of the adjacent lamp image units Ua-Uf so as to eliminate lamp image dead zones.

Therefore, in some embodiments of the present disclosure, the number of the view zones of the autostereoscopic display device 100 may be adjusted by arranging different number of projectors, in order to provide more views and improve the 3D projection effect of the image.

Figure 9:
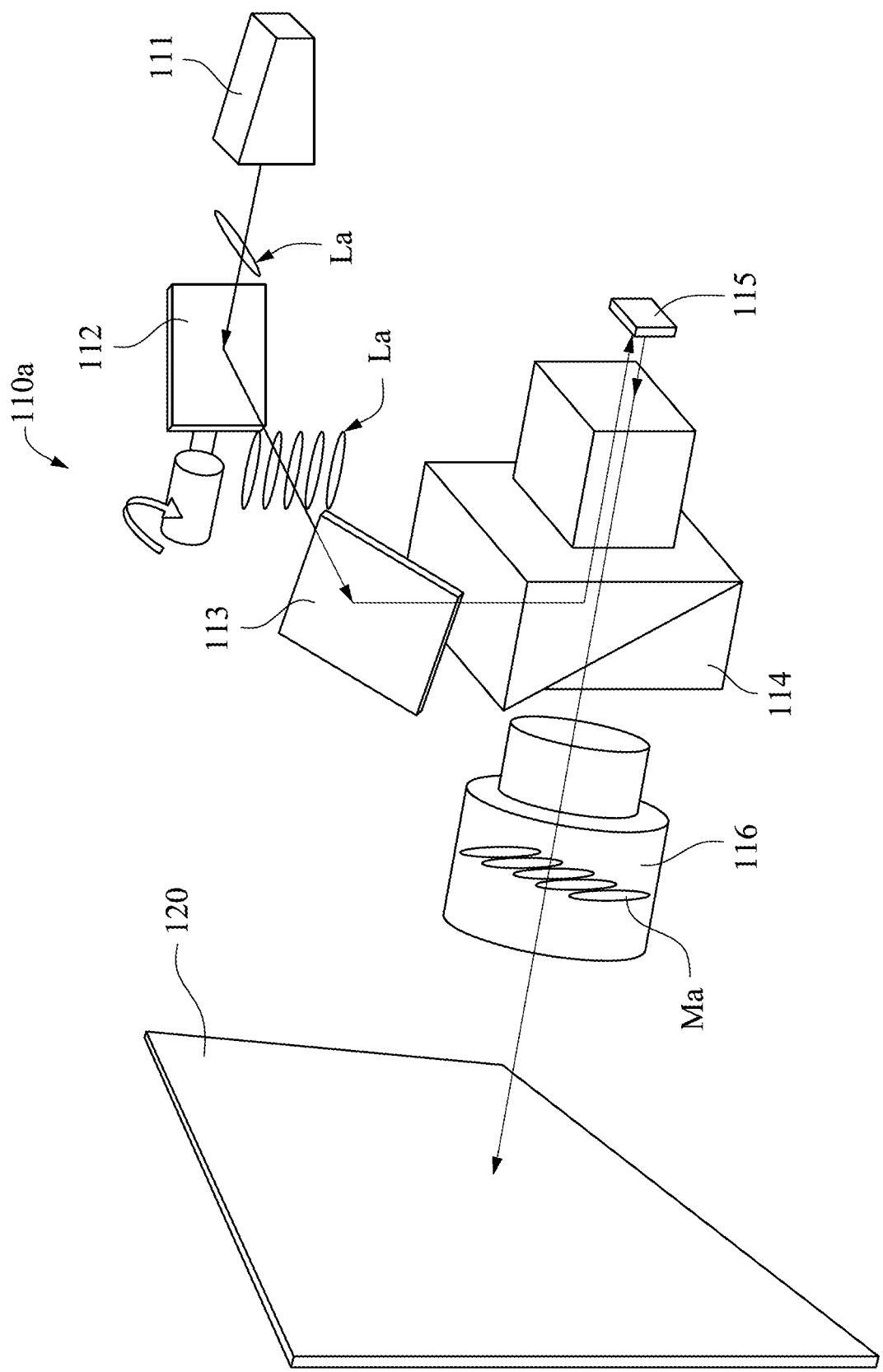
FIG. 9 is a perspective view illustrating a projector according to some embodiments of the present disclosure.

Reference is made to FIG. 9. FIG. 9 is a perspective view illustrating the projector 110a according to some embodiments of the present disclosure. For example, FIG. 9 may be the perspective view illustrating the projector 110a shown in the embodiment of FIG. 2. It is noted that even though the projector 110a of FIG. 2 is used as an example in FIG. 9, the projector 110a of FIG. 9 can be applied to any of the autostereoscopic display devices 100 mentioned above according to actual requirements. The projector 110a includes a light source 111, a light deflecting device 112, a reflective mirror 113, a prism group 114, a light modulator 115, and a lens 116. The light source 111 is configured to provide a light beam La. The light deflecting device 112, which may be a galvano-mirror, is configured to deflect the propagation direction of the light beam La in sequence. The reflective mirror 113 is configured to reflect the light beam La that is reflected from the light deflecting device 112 to the prism group 114. The prism group 114 is configured to guide the light beam La that is reflected from the reflective mirror 113 to the light modulator 115. The light modulator 115 is configured to modulate the light beam La into a plurality of lamp images Ma in sequence. The prism group 114 is further configured to guide the lamp images Ma that propagates from the light modulator 115 to the lens 116. The lens 116 is configured to project the lamp images Ma onto the screen 120.

Accordingly, in one time period, the light beam La emitted from the light source 111 impinges on the light deflecting device 112 so as to be deflected to one direction. Subsequently, the light beam La is incident the reflective mirror 113, and is reflected to the prism group 114 by the reflective mirror 113. The light beam La is then guided to the light modulator 115 by the prism group 114, and the light modulator 115 modulates the light beam La into the lamp image Ma. The lamp image Ma propagates back to the prism group 114 and is guided to the lens 116 by the prism group 114. The lens 116 then projects the lamp image Ma onto the screen 120. In the next time period, the light deflecting device 112 rotates an angle such that the light beam La that impinges on the light deflecting device 112 is deflected to another direction. Accordingly, the lamp images Ma that propagate to different directions in sequence are generated by rotating the light deflecting device 112. It is noted that the configuration of the projector 110a in FIG. 9 is illustrative only and should not limit the present disclosure. One skilled in the art may choose other projectors which can generate lamp images that propagate to different directions in sequence to be applied in the autostereoscopic display device 100 in the present disclosure.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An autostereoscopic display device, comprising:
   a plurality of projectors, each of the projectors being configured to provide a corresponding lamp image unit, each of the lamp image units comprising a plurality of lamp images actuated in sequence, the lamp images respectively projecting to different directions; and
   a screen having an image plane, comprising:
      a first micro-lens array configured to respectively guide the lamp image units to the image plane, such that the lamp image units are connected to each other end to end and circular-aligned as a lamp image unit set on the image plane;
      a second micro-lens array disposed opposing the first micro-lens array, the second micro-lens array being configured to enlarge projection angles of the lamp image units in the lamp image unit set, and project the lamp image unit set to an observing surface; and
      a plurality of pixels arranged as an array, wherein the pixels correspond to a plurality of second lens units in the second micro-lens array in a one-to-one manner, and one of the pixels corresponds to N of a plurality of first lens units in the first micro-lens array, N is equal to the number of the lamp image units.

2. The autostereoscopic display device of claim 1, further comprising:
   a collimating lens disposed between the projectors and the screen, configured to collimate the lamp image units to guide the lamp image units to the first micro-lens array.

3. The autostereoscopic display device of claim 1, wherein the lamp image units in the lamp image unit set are guided to the image plane by different first lens units respectively.

4. The autostereoscopic display device of claim 1, wherein the corresponding lamp image unit set of a target pixel in the pixels is guided to the image plane by the first lens units corresponding to the pixels adjacent to the target pixel.

5. The autostereoscopic display device of claim 4, wherein the corresponding lamp image unit set of the target pixel is projected to the observing surface by the second lens units corresponding to the target pixel.

6. The autostereoscopic display device of claim 1, wherein the image plane is a confocal plane of the first micro-lens array and the second micro-lens array.

7. An autostereoscopic display method, comprising:
providing a plurality of projectors, each of the projectors being configured to provide a corresponding lamp image unit, each of the lamp image units comprising a plurality of lamp images actuated in sequence and projected in different directions respectively; and
projecting the lamp image units onto a screen, comprising:
projecting the lamp image units to a first micro-lens array of the screen to guide the lamp image units respectively to an image plane of the screen, such that the lamp image units are connected to each other end to end and circular-aligned as a lamp image unit set on the image plane; and
guiding the lamp image unit set to a second micro-lens array of the screen to enlarge projection angles of the lamp image units in the lamp image unit set, and project the lamp image unit set to an observing surface;
wherein the screen comprises a plurality of pixels arranged as an array, and the pixels correspond to a plurality of second lens units in the second micro-lens array in a one-to-one manner, and one of the pixels corresponds to N of a plurality of first lens units in the first micro-lens array, N is equal to the number of the lamp image units.

8. The autostereoscopic display method of claim 7, further comprising:
collimating the lamp image units to guide the lamp image units to the first micro-lens array.

9. The autostereoscopic display method of claim 7, wherein the first micro-lens array comprises a plurality of first lens units, and projecting the lamp image units onto the screen further comprises:
guiding the lamp image units to the image plane by different first lens units respectively, such that the lamp image units are connected to each other end to end and circular-aligned as a lamp image unit set on the image plane.

10. The autostereoscopic display of claim 1, wherein:
the image plane of the screen is disposed between the first micro-lens array and the second micro-lens array;
the first micro-lens array comprises a plurality of lens units; and
along a direction substantially normal to the observing surface, a majority of the lamp image set formed by the end to end and circular-aligned connection of the lamp image units is aligned with one of the lens units of the first micro-lens array.

11. The autostereoscopic display of claim 10, wherein the second micro-lens array comprises a plurality of lens units, and along the direction substantially normal to the observing surface, said majority of the lamp image set formed by the end to end and circular-aligned connection of the lamp image units is aligned also with one of the lens units of the second micro-lens array.

12. The autostereoscopic display device of claim 1, wherein the image plane of the screen is disposed between the first micro-lens array and the second micro-lens array, and the lamp image set on the image plane is formed by the lamp image units of all of the projectors.

13. The autostereoscopic display of claim 12, wherein:
for each of the projectors, the plurality of lamp images for the corresponding lamp image unit are projected to different directions to be aligned in a single column, the column of the lamp images comprising two outermost lamp images and a plurality of middle lamp images sandwiched between the outermost lamp images, each of the outermost lamp images being immediately adjacent to one of the middle lamp images, and each of the middle lamp images being immediately adjacent to either one of the outermost lamp images and one of the middle lamp images or two of the middle lamp images; and for the lamp image set on the image plane, each of the lamp image units is immediately adjacent to two other ones of the lamp image units, one of the outermost lamp images of said each of the lamp image units being immediately adjacent to one of the outermost lamp images of one of said two other ones of the lamp image units so that there is no gap therebetween, and the other one of the outermost lamp images of said each of the lamp image units being immediately adjacent to one of the outermost lamp images of the other one of said two other ones of the lamp image units so that there is no gap therebetween.

* * * * *